US 8,344,717 B2

(12) United States Patent
Philbrick et al.

(10) Patent No.: US 8,344,717 B2
(45) Date of Patent: *Jan. 1, 2013

(54) SWITCHING REGULATOR WITH BALANCED CONTROL CONFIGURATION WITH FILTERING AND REFERENCING TO ELIMINATE COMPENSATION

(75) Inventors: Rhys S. A. Philbrick, Cary, NC (US);
Matthew B. Harris, Durham, NC (US);
Steven P. Laur, Raleigh, NC (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,015

(22) Filed: Jan. 31, 2012

(65) Prior Publication Data

US 2012/0126773 A1 May 24, 2012

Related U.S. Application Data

(63) Continuation of application No. 12/324,368, filed on Nov. 26, 2008, now Pat. No. 8,154,268.

(60) Provisional application No. 60/991,847, filed on Dec. 3, 2007, provisional application No. 61/021,178, filed on Jan. 15, 2008.

(51) Int. Cl.
*G05F 1/565* (2006.01)
*G05F 1/575* (2006.01)
(52) U.S. Cl. .................. 323/286; 323/282; 323/285
(58) Field of Classification Search .......... 323/282–286, 323/288
See application file for complete search history.

(56) References Cited

U.S. PATENT DOCUMENTS

| 5,490,055 | A | 2/1996 | Boylan et al. |
| 5,600,234 | A | 2/1997 | Hastings et al. |
| 6,229,292 | B1 | 5/2001 | Redl et al. |
| 7,023,182 | B1 | 4/2006 | Kleine et al. |
| 7,145,317 | B1 | 12/2006 | Shah |
| 7,538,535 | B2 | 5/2009 | McDonald et al. |
| 7,876,077 | B2 * | 1/2011 | Nishimori ................ 323/282 |
| 8,085,011 | B1 * | 12/2011 | Petricek ................ 323/259 |
| 8,085,563 | B2 * | 12/2011 | Gaboury et al. ........... 363/89 |
| 2003/0142519 | A1 | 7/2003 | Walters et al. |
| 2005/0017703 | A1 | 1/2005 | Walters et al. |
| 2007/0035283 | A1 * | 2/2007 | Liao ..................... 323/282 |
| 2007/0139027 | A1 | 6/2007 | Nishimori |
| 2009/0009148 | A1 | 1/2009 | Philbrick |

* cited by examiner

*Primary Examiner* — Adolf Berhane
*Assistant Examiner* — Fred E Finch, III
(74) *Attorney, Agent, or Firm* — Gary Stanford

(57) ABSTRACT

A switching regulator and controller and an electronic device using same are disclosed in which the controller includes a sense circuit, an error amplifier circuit, a filter and reference circuit, and a comparator circuit. The switching regulator includes a pulse switch circuit coupled to an output inductor for developing an output voltage. The sense circuit provides a sense signal indicative of current through the output inductor. The error amplifier circuit develops an error signal indicative of error of the output voltage. The filter and reference circuit high pass filters the sense signal to provide a filtered sense signal and which balances the filtered sense signal and the error signal at a common DC level. The comparator circuit develops a pulse control signal using the error signal and the filtered sense signal, where the pulse control signal is for controlling switching of the pulse switch circuit.

20 Claims, 8 Drawing Sheets

US 8,344,717 B2

SWITCHING REGULATOR WITH BALANCED CONTROL CONFIGURATION WITH FILTERING AND REFERENCING TO ELIMINATE COMPENSATION

CROSS-REFERENCE TO RELATED APPLICATIONS

This application is a continuation of pending U.S. application Ser. No. 12/324,368, filed Nov. 26, 2008 which is herein incorporated by reference in its entirety; U.S. application Ser. No. 12/324,368 claims the benefit of U.S. Provisional Applications including Ser. No. 60/991,847, filed on Nov. 29, 2007 and Ser. No. 61/021,178, filed on Jan. 15, 2008, which are herein incorporated by reference in their entireties for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Many switching regulator or DC/DC converter configurations employ a feedback control loop for purposes of controlling at least one operating parameter of the regulator, such as output voltage, output current, maximum input or output current, etc. Current-mode regulator technologies are employed for their ease of implementation and their access to and control of the current signal. They often require a high-gain operational error amplifier to reduce output impedance necessitating a complex compensation network to stabilize the feedback loop and return performance to the system. This adds cost, difficulty, and size and can compromise performance. As further described herein, if the current signal is high-pass filtered, and if the system is referenced in a balanced manner, then the high-gain error amplifier may be replaced with a low-gain amplifier in which the regulator still maintains a low output impedance and accurate DC regulation performance. Replacing the high gain error amplifier with a low gain amplifier makes the regulator stable without any compensation. This makes the regulator cheaper, faster and less complex. The present invention is described in relation to current mode regulators, where it is understood that the present invention may be applied to other types of regulators.

One particular regulator is referred to as a synthetic ripple regulator which generates an artificial or synthesized ripple waveform that controls the switching operation of the regulator. The synthetic ripple regulator, however, typically uses a high gain amplifier in the control loop to compensate for DC voltage in the error signal. The high gain amplifier requires, in turn, a compensation circuit to avoid unwanted oscillations and to maintain control. The high gain amplifier and corresponding compensation circuit consumes valuable die space on the controller chip. Further, the compensation circuit causes phase delay and reduces transient response. Similar problems exist for other current mode controlled regulators and DC/DC converters.

Figure 1:
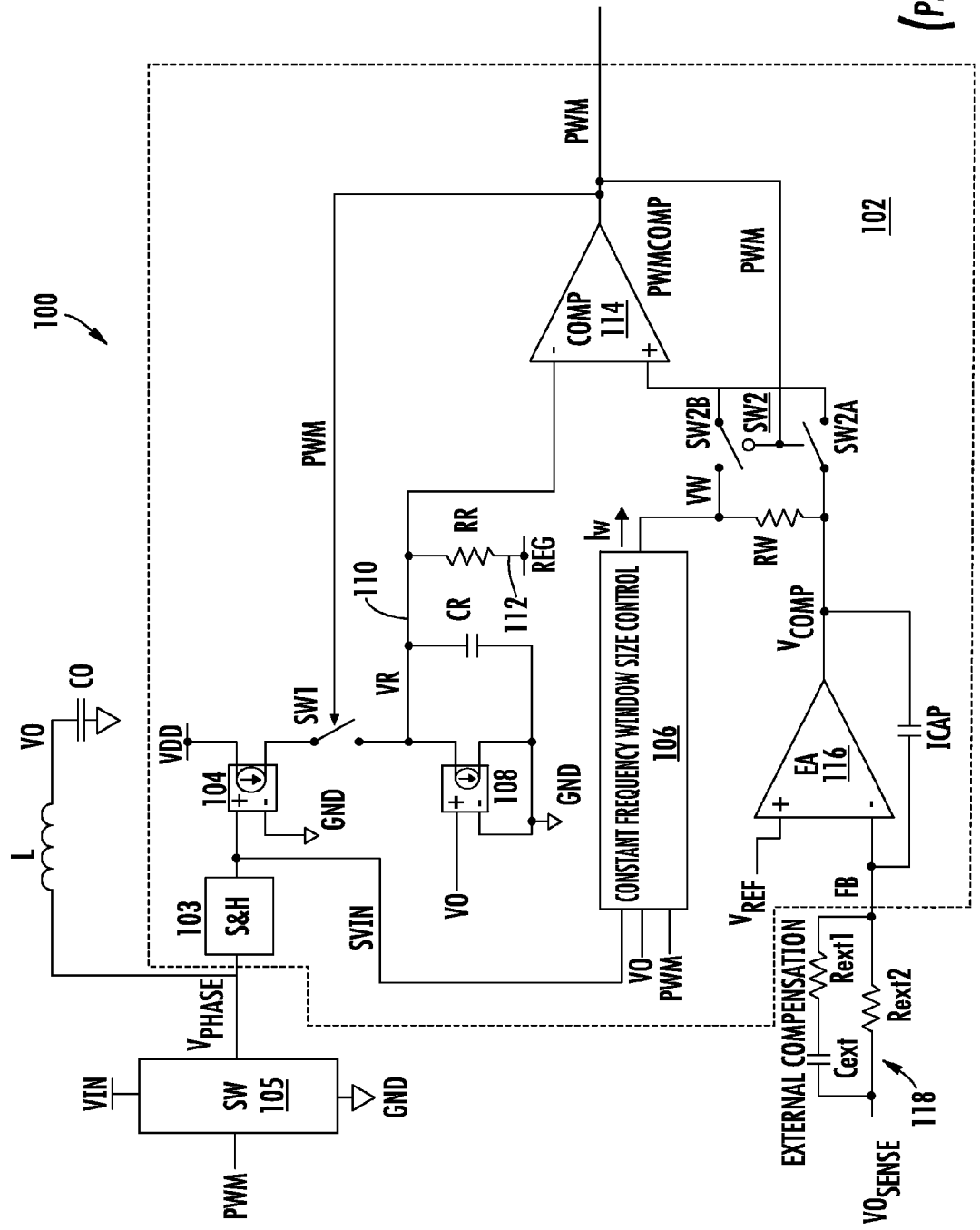
FIG. 1 is a schematic and block diagram of a conventional synthetic ripple regulator.

FIG. 1 is a schematic and block diagram of a conventional synthetic ripple regulator 100. A pulse width modulation (PWM) signal controls a switch circuit 105 to switch input voltage VIN through a phase node developing a phase voltage $V_{PHASE}$ to one end of an output inductor L. The other end of the output inductor L develops an output voltage VO across an output capacitor CO. The switch circuit 105 is coupled between VIN and ground (GND) and may include electronic switches or the like (not shown), such as a series-coupled pair of metal-oxide semiconductor, field-effect transistors (MOSFETs) as known to those skilled in the art. The switch circuit 105 also includes a switch driver (not shown) for driving the gates of the electronic switches. During switching operation, when the PWM signal is asserted to a first level (e.g., high), the upper switch is turned on coupling VIN to the output inductor L. When the PWM signal is asserted to a second level (e.g., low), the lower switch is turned on coupling the output inductor L to ground. Thus, the phase voltage $V_{PHASE}$ is generally switched between ground and VIN during switching operation, although current through the output inductor L causes the voltage to vary during certain portions of each cycle as understood by those skilled in the art.

The switch circuit 105, the output inductor L, the output capacitor CO, and an external resistor-capacitor (RC) compensation circuit 118 (among other supporting components) are generally external components relative to a regulator control integrated circuit (IC) 102. The phase node developing the phase voltage $V_{PHASE}$ is available to the regulator control IC 102 whereas the input voltage VIN is not (to avoid an additional pin on the regulator control IC 102). In the illustrated embodiment, the regulator control IC 102 includes a sample and hold (S&H) circuit 103 which samples the $V_{PHASE}$ voltage when the upper switch is turned on to effectively sample VIN. The output of the S&H circuit 103 provides a sampled version of VIN, shown as SVIN, which is provided to the positive voltage input of a transconductance (gm) amplifier 104 and to one input of a frequency control circuit 106. The negative voltage input of the transconductance amplifier 104 is coupled to ground. The transconductance amplifier 104 has a pair of outputs coupled between a supply voltage VDD and a first switched terminal of a switch SW1. The other switched terminal of the switch SW1 is coupled to a node 110. The transconductance amplifier 104 provides an output current proportional to the input voltage VIN to node 110 when the switch SW1 is closed. The switch SW1 receives the PWM signal at its control input and the switch SW1 is closed when the PWM signal is asserted to the first level (e.g., when the upper switch of the switch circuit 105 is on) and otherwise opened.

The output voltage VO is provided to the positive voltage input of another transconductance amplifier 108 having its negative voltage input coupled to ground. The current output terminals of the transconductance amplifier 108 are coupled between node 110 and ground. A ripple capacitor CR is coupled between node 110 and ground and a ripple resistor RR is coupled between node 110 and a node 112. A DC voltage source 113 provides a regulated constant voltage level REG to node 112. In one embodiment, CR has a capacitance of approximately 30 picofarads (pf). In one embodiment, REG is a constant voltage regulated at approximately 1.1 Volts (V). The resistance of the resistor RR may be within a suitable range but is generally a relative high value, such as 800 kilohms (kΩ) or the like as shown. The transconductance amplifier 108 draws a current based on the output voltage VO from node 110. The node 110 develops a ripple voltage VR and is coupled to the inverting (−) input of a comparator 114. The non-inverting (+) input of the comparator 114 is a node 209 developing a switched error voltage SERR, which is selectively coupled to either a window voltage VW or a compensation voltage $V_{COMP}$ based on the state of a switch circuit SW2 controlled by the PWM signal. The switch circuit SW2 includes two switches SW2A and SW2B, where SW2A is closed when PWM is high and opened when PWM is low, and where SW2B is opened when PWM is high and closed when PWM is low. The output voltage VO, the PWM signal and SVIN (equivalent to VIN) are provided to respective inputs of the frequency control circuit 106, which has an output coupled to one end of a window resistor RW. The other end of the resistor RW is coupled to the output of an error amplifier (EA) 116 developing the compensation voltage $V_{COMP}$. The frequency control circuit 106 develops a window current $I_W$ at its output, which is provided through the resistor RW to develop the window voltage VW relative to $V_{COMP}$. An internal reference voltage $V_{REF}$ is provided to the non-inverting input of the EA 116. An output voltage sense signal $VO_{SENSE}$ is provided to one end of the external compensation circuit 118, having its other end coupled to an input pin (shown as a feedback pin FB) of the regulator control IC 102 receiving $VO_{SENSE}$. $VO_{SENSE}$ is either the output voltage VO or a sensed and divided version thereof, such as provided by a resistive voltage divider or the like (not shown). The FB input pin is internally provided to the inverting input of the EA 116 and to one end of an internal capacitor ICAP. The other end of ICAP is coupled to the output of the EA 116.

In operation, the transconductance amplifier 108 draws current based on the output voltage VO from node 110 to continually discharge the ripple capacitor CR. When the switch SW1 is closed upon assertion of the PWM signal, a current based on the input voltage VIN provided through the switch SW1 by the transconductance amplifier 104 to charge the capacitor CR. Since VIN is greater than VO, when the switch SW1 is closed and the capacitor CR is charged by a collective current based on a difference between the voltages VIN and VO, or VIN−VO. When the switch SW1 is opened (when PWM is not asserted) the capacitor CR is discharged based on VO. As understood by those skilled in the art, the voltage VO is continually applied to one end of the output inductor L. The other end of the output inductor L is switched between the input voltage VIN and ground, causing a ripple current to flow through the output inductor L based on VIN and VO. In this manner, the voltage VR is a ripple voltage representing the ripple current through output inductor L. The EA 116 develops the $V_{COMP}$ signal as a compensation voltage indicative of the relative error of VO. In particular, the voltage on FB is compared to the reference voltage $V_{REF}$ which represents the target voltage level of VO. When PWM is asserted to the first level (e.g., low), the voltage of VR rises at a constant rate (based on charge voltage VIN−VO) and the switch SW2 selects VW (e.g., SW2B is closed). When the voltage of VR rises above the voltage of VW, the comparator 114 switches PWM to the second level (e.g., high) causing the switch SW2 to switch to $V_{COMP}$ (e.g., SW2A is opened) and causing the switch SW1 to open so that VR decreases at a constant rate. In this manner, the comparator 114 operates as a hysteretic comparator which compares the synthetic ripple voltage VR within a window voltage between $V_{COMP}$ and VW. The frequency control circuit 106 adjusts the window current $I_W$ to adjust the window voltage VW relative to $V_{COMP}$ to maintain a relatively constant switching frequency of the synthetic ripple regulator 100.

It is desired that the output of the regulator have a relatively low impedance. The error signal $V_{COMP}$ has a significant level of DC and is developed in an unbalanced feedback loop. Note, for example, that the window voltage VW is developed on top of the $V_{COMP}$ voltage and is compared with VR emulating inductor current. In view of these factors, the control loop requires the EA 116 to have relatively high gain. The high gain of the EA 116 requires the external compensation circuit 118 to stabilize the loop to maintain loop control. The high gain of EA 116 and the corresponding need for the compensation circuit 118 consumes valuable die space on the regulator control IC 102. Further, the compensation circuit 118 causes significant phase delay and reduces transient response. In this manner, the regulator control IC 102 is not as responsive to changes of VO or VIN or changes of other operating parameters.

Figure 2:
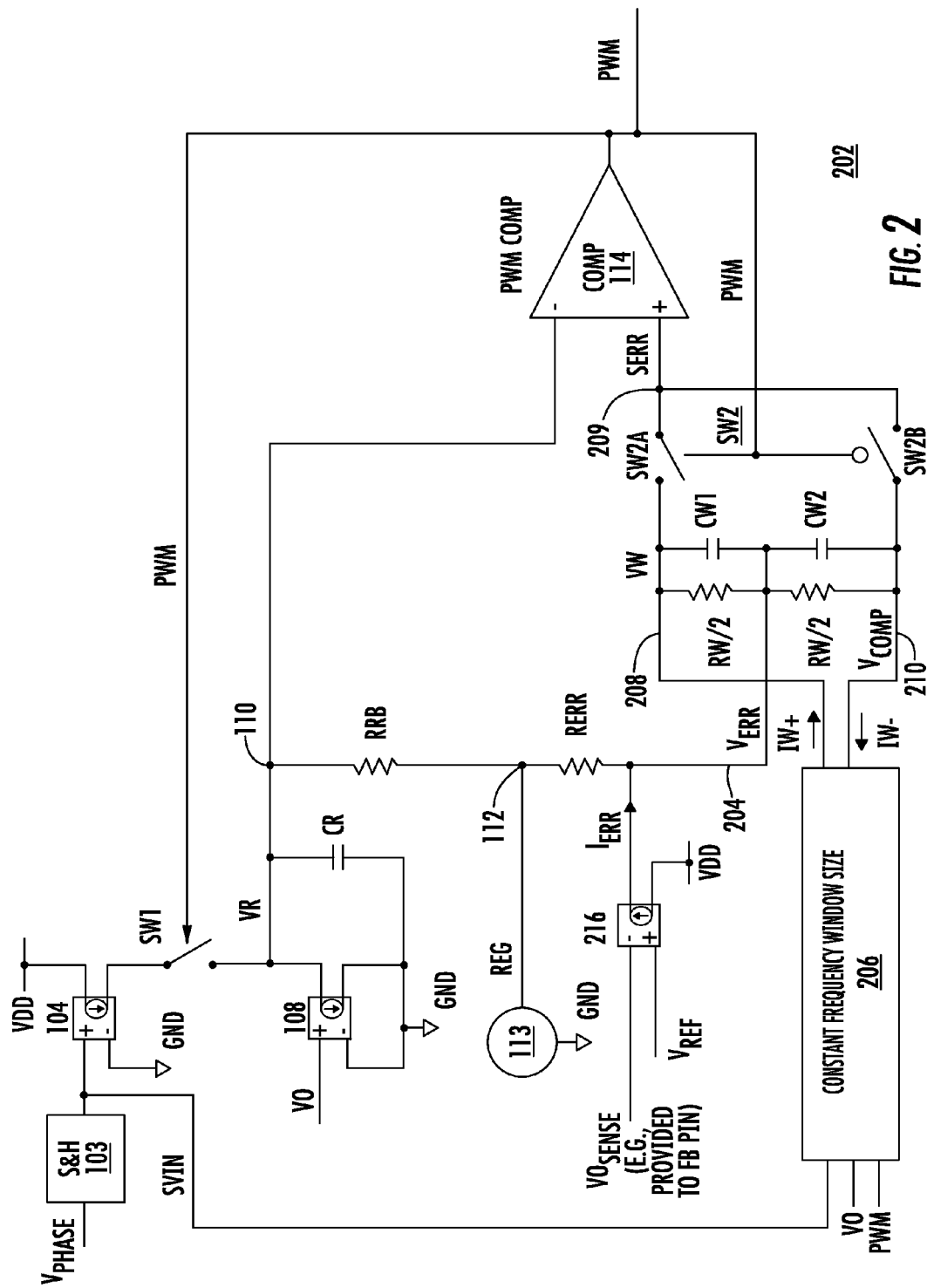
FIG. 2 is a schematic and block diagram of a regulator control IC implemented according to one embodiment of the present invention.

FIG. 2 is a schematic and block diagram of a regulator control IC 202 implemented according to one embodiment of the present invention. The regulator control IC 202 replaces the regulator control IC 102 of the synthetic ripple regulator 100 to provide a balanced control configuration without compensation. Similar components between the controllers 102 and 202 assume identical reference numbers. The switch circuit SW, the output inductor L, and the output capacitor CO are externally coupled in similar manner and thus are not shown in FIG. 2. The external compensation circuit 118, however, is eliminated. The S&H circuit 103, the transconductance amplifiers 104 and 108, the ripple capacitor CR, the comparator 114, and the switch circuits SW1 and SW2 are included and coupled to operate in substantially similar manner. The ripple resistor RR is replaced by a different ripple resistor RRB, which is similar to RR except having significantly reduced resistance. In the illustrated embodiment, for example, the resistor RRB has a resistance of approximately 100 kΩ rather than 800 kΩ as the case for the resistor RR in the illustrated embodiment. The frequency control circuit 106 is replaced with a similar frequency control circuit 206 which operates in a similar manner except that it develops a differential window current IW+ and IW− at a pair of outputs rather than a single-ended window current IW. The high gain EA 116 is replaced by transconductance amplifier 216 having voltage inputs coupled between the FB input pin receiving $VO_{SENSE}$ and the reference voltage $V_{REF}$. In the illustrated embodiment, $VO_{SENSE}$ is provided to the negative voltage input and $V_{REF}$ is provided to the positive voltage input of the transconductance amplifier 216.

The transconductance amplifier 216 provides an error current $I_{ERR}$ to an error node 204 through a pair of current outputs coupled between VDD and node 204. An error resistor RERR is coupled between node 204 and the node 112 developing the regulated voltage REG. In one embodiment, REG is approximately 1.1V and RERR is approximately 30 kΩ. In one embodiment, the transconductance (gm) of the transconductance amplifier 216 and the resistance of RERR is such that gm*RERR=40 (in which an asterisk "*" denotes multiplication). The window resistor RW is replaced with a pair of window resistors RW/2, each having one end coupled to the error node 204. In one embodiment, each of the window resistors RW/2 have a resistance of approximately 110 ka The other end of one window resistor RW/2 is coupled to a node 208, which is further coupled to the positive output of the frequency control circuit 206 providing the IW+ current. The other end of the other window resistor RW/2 is coupled to a node 210, which is further coupled to the negative output of the frequency control circuit 206 providing the IW− current. A pair of window capacitors CW1 and CW2 are provided in which CW1 is coupled between nodes 208 and 204 and CW2 is coupled between nodes 210 and 204. In one embodiment the window capacitors CW1 and CW2 are relatively small-valued capacitors having approximately equal capacitance of approximately 2 pf. Node 208 develops a window voltage VW and node 210 develops a compensation voltage $V_{COMP}$. The switch SW2 selects between nodes 208 and 210 for selectively providing either one of VW or $V_{COMP}$ to the non-inverting input of the comparator 114 as controlled by the PWM signal. The resistors RW/2 and the capacitors CW1 and CW2 with center node 204 and nodes 208 and 210 on either side collectively forms a balanced hysteretic window circuit.

Operation of the regulator control IC 202 is similar to that of the regulator control IC 102 with significant modifications. First, the high gain EA 116 is replaced by the low gain transconductance amplifier 216 having its output resistor RERR tied off to the constant regulation voltage REG, which is the same voltage REG used to tie off the ripple resistor R. In one embodiment, REG is approximately 1.1V. The transconductance amplifier 216 is a low gain amplifier eliminating the need for the compensation circuit 118. The resistance of the ripple resistor RRB is significantly reduced as compared to the resistance of the ripple resistor RR (e.g., 800 kΩ down to 100 kΩ in the illustrated embodiment). In this manner, the voltage VR no longer emulates the ripple current through the output inductor L. Instead, the emulated ripple voltage is provided through a high pass filter, which is made by making the modulator ripple time constant RRB*CR significantly higher than the time constant of the output inductor L, or $L/R_{DCR}$ (in which the forward slash "/" denotes division and in which $R_{DCR}$ is the DC resistance of the inductor L). In this manner, the ripple voltage is filtered to remove DC so that the inductor ripple current is viewed from the AC perspective. The hysteretic voltage window is centered at the output of the transconductance error amplifier 216 at node 204. The high pass filtering of the emulated ripple current signal and the centered voltage error signal provides a balanced configuration which eliminates the need for a high gain error amplifier. Elimination of the high gain amplifier eliminates the need for the feedback compensation circuit, which reduces the components and increases available space and speeds up the transient response of the regulator controller.

Figure 12:
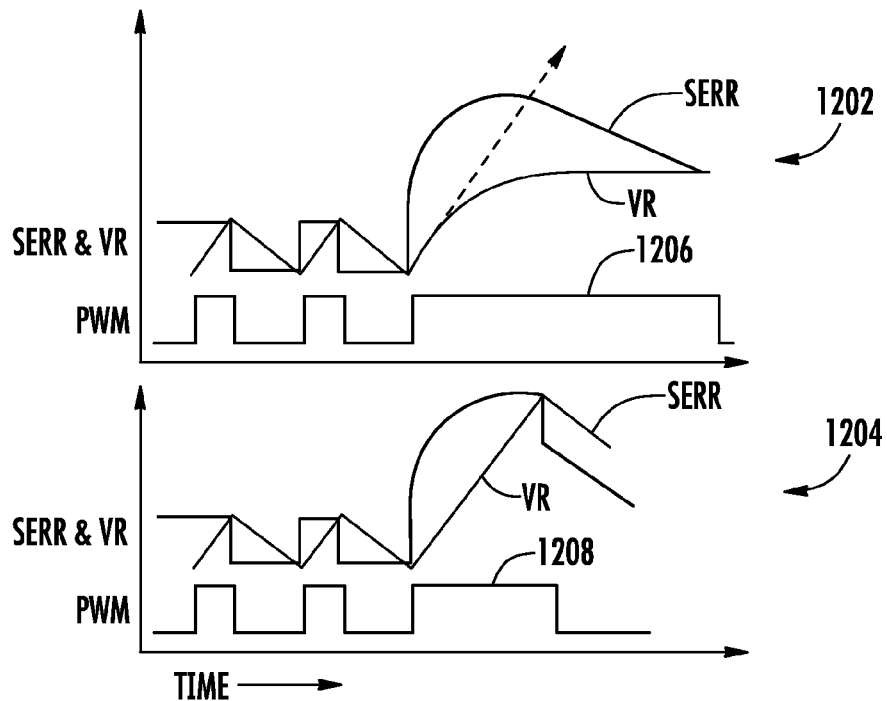
FIG. 12 is a graphic diagram include two graphs which plot the SERR voltage superimposed with VR and PWM versus time for two different cases in which RRB remains coupled (graph 1202) and in which RRB is decoupled under certain conditions (graph 1204)

It is noted that the VR signal may saturate during load application transient as shown in FIG. 12. FIG. 12 is a graphic diagram include two graphs 1202 and 1204 which plot the SERR voltage (at the non-inverting input of 114) superimposed with VR (at the inverting input of 114) and PWM versus time for two different cases in which RRB remains coupled (graph 1202) and in which RRB is decoupled under certain conditions (graph 1204). If the output capacitor CO has a significant equivalent series resistance (ESR), then the non-inverting input of the comparator 114 recovers quickly and the PWM signal is well-controlled. As shown by graph 1202, however, if the output capacitor CO has low ESR (e.g., low ESR ceramic and the like), then it may take significant time for the comparator 114 to recover, which creates a relatively long PWM pulse shown at 1206 which in turn potentially causes a condition known as ring-back. The ring-back condition for load application may be resolved by disconnecting RRB while PWM is high as shown by graph 1204 in which the during of the PWM pulse, shown at 1208, is reduced. The ring-back condition may occur in similar manner for load release. In one embodiment, as soon as PWM goes low, a time constant matching RRB*CR is charged. When the time constant reaches 90%, then RRB is disconnected.

Figure 13:
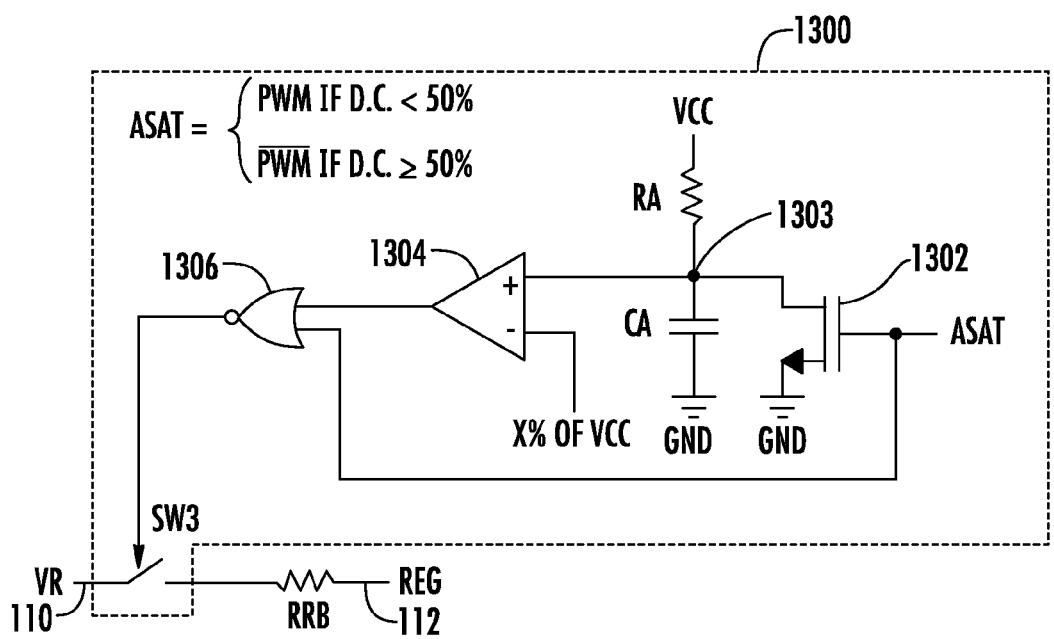
FIG. 13 is a schematic diagram of an anti-saturation circuit according to one embodiment which may be inserted on either side of the resistor RRB of FIG. 2.

FIG. 13 is a schematic diagram of an anti-saturation circuit 1300 according to one embodiment which may be inserted on either side of the resistor RRB of the regulator control IC 202. As shown, it is inserted between RRB and node 110 in which it may alternative be inserted between RRB and node 112 with substantially the same results. An anti-saturation (ASAT) signal is developed based on PWM and its duty cycle (D.C.). ASAT=PWM when the duty cycle is below 50% and ASAT is opposite of PWM (shown with bar above PWM signal) when the duty cycle is greater than or equal to 50%. ASAT is provided to the gate of an N-channel FET 1302 having its source coupled to ground and its drain coupled to the non-inverting input of a comparator 1304 at a node 1303. A resistor RA is coupled between a DC voltage VCC and node 1303 and a capacitor CA is coupled between node 1303 and ground. A certain proportion of the voltage VCC, shown as X % of VCC, is provided to the inverting input of the comparator 1304, where VCC and X % are both arbitrary values that determine the amount of time until saturation is achieved. These values VCC and X % are scaled according to the particular configuration or implementation. The output of the comparator 1304 is provided to one input of a two-input NOR (NOR) gate 1306, which receives the ASAT signal at its other input. The output of the NOR gate 1306 is provided to the control input of a switch SW3, having switched terminals coupled between RRB and node 110 developing the VR voltage. As noted above, switch SW3 may alternatively be inserted between RRB and node 112. The resistor RA and capacitor CA are selected such that RA*CA is approximately equal to RRB*CR (or RA*CA≈RRB*CR). Operation of the anti-saturation circuit 1300 is illustrated in conjunction with the operation of the IC 202 as shown in graph 1204 of FIG. 12.

Figure 3:
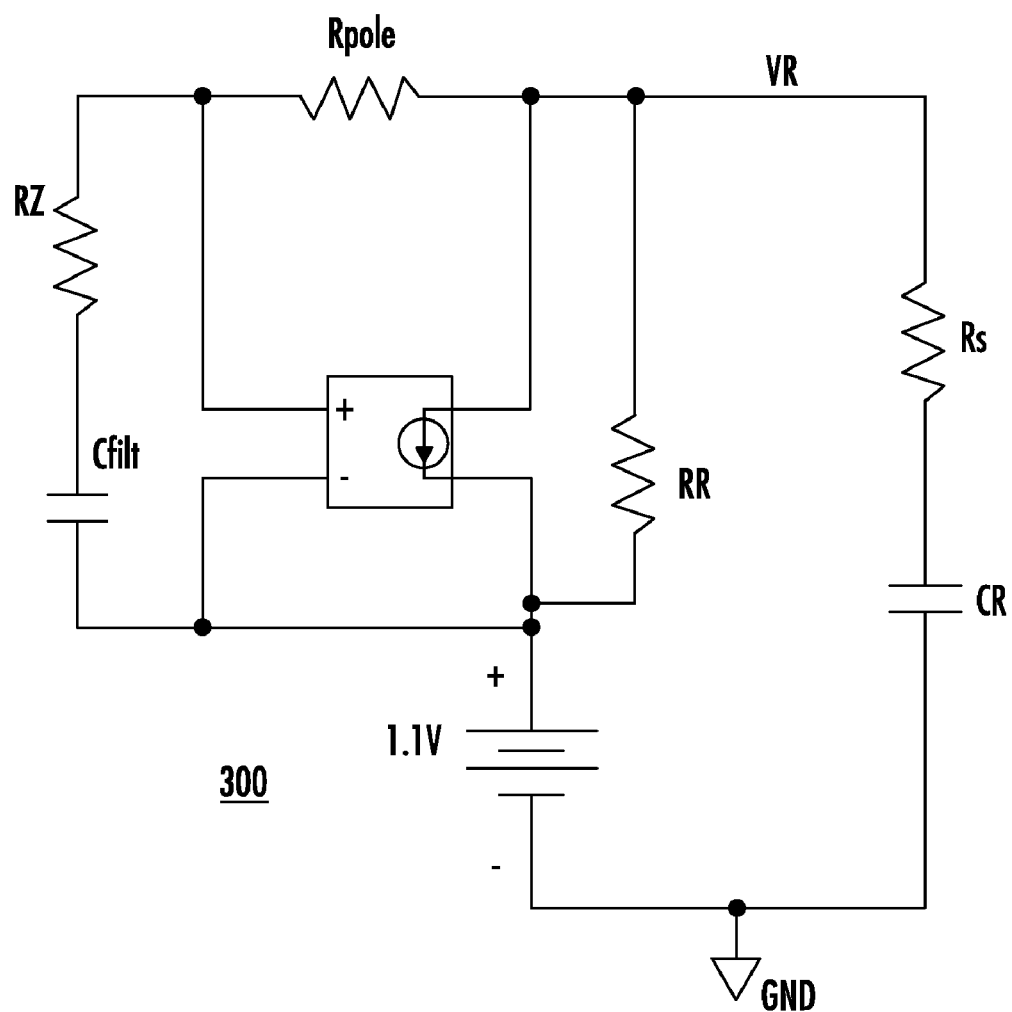
FIG. 3 is a schematic diagram of an active ripple cancelation circuit which may be used to replace the ripple resistor RRB of FIG. 2 in order to provide the ability to tune the frequency.

FIG. 3 is a schematic diagram of an active ripple cancelation circuit 300 which may be used to replace the ripple resistor RRB of FIG. 2 in order to provide the ability to tune the frequency. It is noted that the frequency should not be tuned by lower RRB or by increasing CR. Instead, the resistor RRB is replaced by the active ripple cancelation circuit 300 to enable frequency tuning as desired.

The concepts applied to the synthetic ripple regulator as described above are equally applicable to any internally compensated current-mode switching regulator or DC/DC converter.

Figure 4:
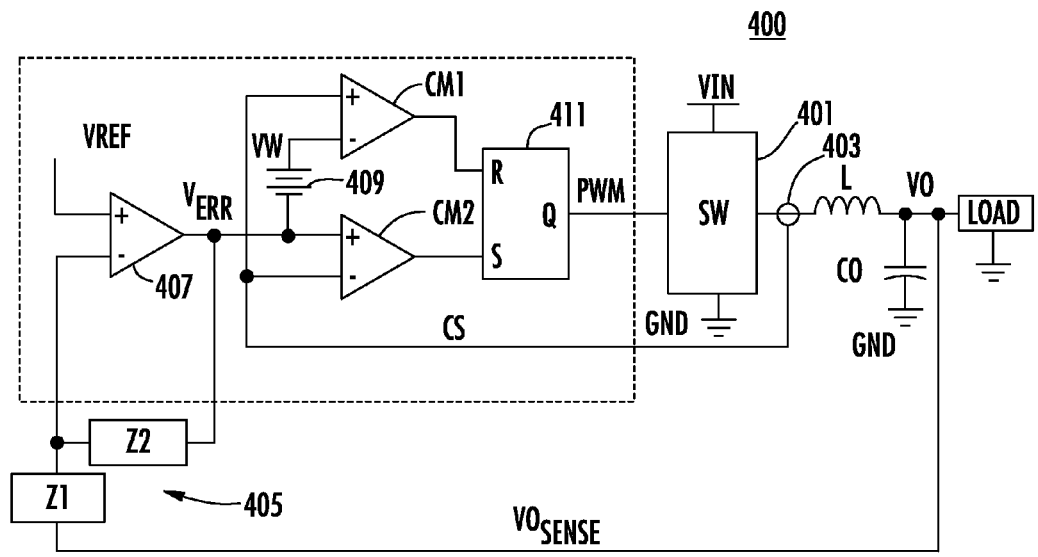
FIG. 4 is a conventional peak-valley current-mode regulator.

FIG. 4 is a conventional peak-valley current-mode regulator 400. The conventional regulator 400 includes a switch circuit 401 (similar to the switch circuit 105) switching an input voltage VIN through an output inductor L to develop an output voltage VO across an output capacitor CO and a LOAD, both referenced to ground. A current sensor 403, such as a transducer or the like, measures current through the output inductor L and converts and scales the measured current into a voltage signal CS. The output voltage VO is sense ($VO_{SENSE}$) or otherwise directly provided through a compensation circuit 405 to the inverting input of an error amplifier 407. As shown, the compensation circuit 405 includes a first impedance network Z1 coupled between $VO_{SENSE}$ and the inverting input of the error amplifier 407, and a second impedance network Z2 coupled between the inverting input and output of the error amplifier 407. The error amplifier 407 receives VREF at its non-inverting input and develops an error voltage $V_{ERR}$ at its output. A comparator circuit includes a first comparator CM1, a second comparator CM2, and a voltage source 409. The non-inverting input of CM1 and the inverting input of CM2 both receive CS. The non-inverting input of CM2 receives $V_{ERR}$ and is also coupled to the negative terminal of the voltage source 409, which develops a window voltage VW. The positive terminal of the voltage source 409 is coupled to the inverting input of the comparator CM2. The output of the comparator CM1 is provided to the reset input of an SR latch 411 and the output of the comparator CM2 is provided to the set input of the SR latch 411. The Q output of the SR latch 411 develops a PWM signal provided to control the switch circuit 401.

In operation of the regulator 400, when the voltage of CS falls below $V_{ERR}$, the comparator CM2 sets the output of the SR latch 411 which pulls PWM high to initiate a power phase of the switch circuit 401. The voltage CS rises while PWM is high until it reaches $V_{ERR}$+VW at the top of the window voltage range, causing the comparator CM1 to reset the output of the SR latch 411. The PWM is then pulled low so that CS begins decreasing. The PWM signal at the output of the SR latch 411 toggles the state of the switch circuit 401 to continuously energize and de-energize the power stage in this manner. The error signal $V_{ERR}$ is derived from the error amplifier 407 sensing the output voltage VO (directly or via $VO_{SENSE}$) through the impedance network Z1 and connected using negative feedback the other feedback network Z2. The impedance networks Z1 and Z2 are often complex and difficult to tune, and they usually cannot be integrated onto an integrated circuit (IC) or chip. The error amplifier 407 is typically a high gain operational amplifier.

Figure 5:
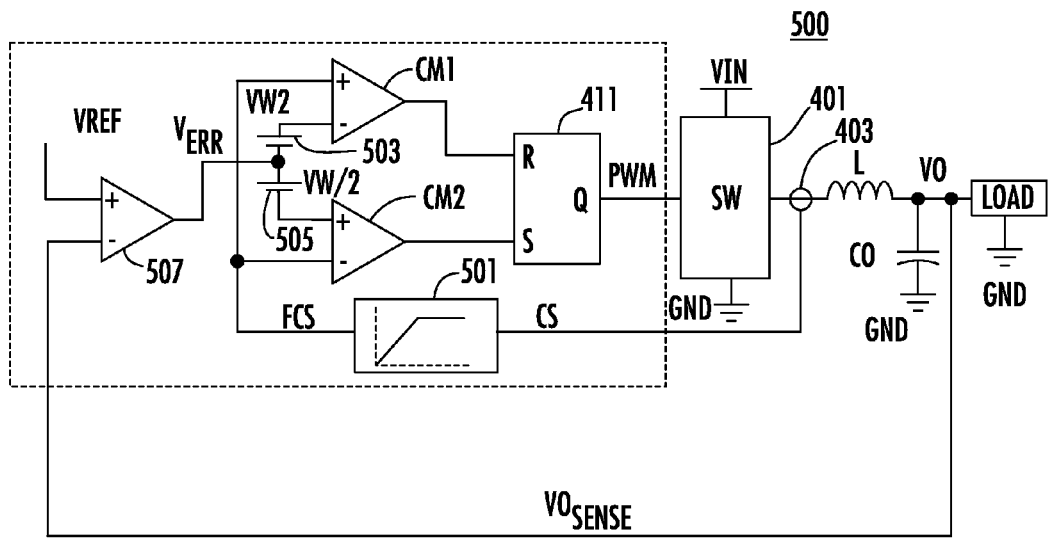
FIG. 5 is a peak-valley current-mode regulator according to another embodiment of the present invention.

FIG. 5 is a peak-valley current-mode regulator 500 according to another embodiment of the present invention. The regulator 500 includes similar components as the regulator 400 in which similar components and devices assume identical reference numbers. In particular, the regulator 500 includes the switch circuit 401, the current sensor 403, the output inductor L, the output capacitor CO, the LOAD, the comparators CM1 and CM2 and the SR latch 411, which are all coupled in similar manner. The regulator 500 further includes a high pass filter 501 having an input receiving CS and an output providing a filtered version of CS, shown as FCS. The high pass filter 501 removes DC information from and attenuates low-frequency information of the CS signal to provide the FCS signal. The FCS signal is provided to the non-inverting input of the comparator CM1 and to the inverting input of the comparator CM2 instead of the CS signal. The compensation circuit 405 is eliminated and the error amplifier 407 is replaced by a different error amplifier 507. The error amplifier 507 receives the VO signal (or $VO_{SENSE}$) at its inverting input, receives VREF at its non-inverting input, and develops $V_{ERR}$ at its output. The voltage source 409 is replaced by two voltage sources 503 and 505, each developing an offset voltage VW/2, which is one-half of VW. $V_{ERR}$ is provided to the negative terminal of the voltage source 503 and to the positive terminal of the voltage source 505. The positive terminal of voltage source 503 is coupled to the inverting input of CM1 and the negative terminal of voltage source 505 is coupled to the non-inverting input of CM2. The remaining portions of the regulator 500 is configuration in substantially the same manner as the regulator 400. The voltage sources 503 and 505 collectively form a balanced voltage circuit having a center node coupled to the output of the error amplifier 507 providing $V_{ERR}$.

In operation of the regulator 500, when FCS falls below $V_{ERR}$ by VW/2, the comparator CM2 sets the SR latch 411 to pull PWM high to initiate the power phase, and when FCS rises above $V_{ERR}$ by VW/2, the comparator CM1 resets the SR latch 411 to pull PWM low for the remaining portion of the cycle. Thus, the output of the SR latch 411 energizes and de-energizes the power stage as described previously. The high pass filter 501 removes DC and attenuates low frequency of the CS signal and the voltage sources 503 and 505 reference FCS and $V_{ERR}$ to the same DC level. In one embodiment, the error signal $V_{ERR}$ is derived from a comparatively simple low-gain amplifier 507 and the external compensation circuit 405 is eliminated.

In an alternative embodiment, the high pass filter 501 is replaced with the appropriate higher-order filter for ripple cancellation and frequency tuning.

Figure 6:
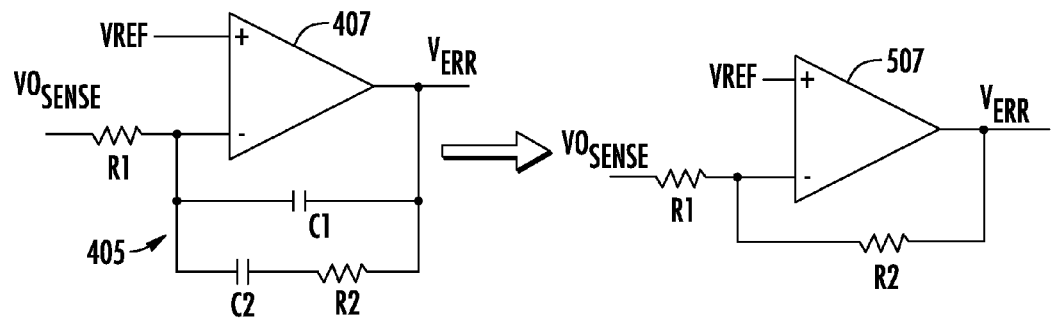
FIG. 6 is a schematic diagram of an exemplary implementation of the error amplifier and the compensation circuit of the regulator of FIG. 4 as compared and an exemplary replacement by the error amplifier and supporting circuitry of the regulator of FIG. 5 in accordance with an embodiment of the present invention.

FIG. 6 is a schematic diagram of an exemplary implementation of the error amplifier 407 with the compensation circuit 405 of the regulator 400 as compared and an exemplary replacement by the error amplifier 507 and supporting circuitry of the regulator 500 in accordance with an embodiment of the present invention. In one embodiment, the error amplifiers 407 and 507 may be implemented using the same high gain operational amplifier. In an alternative embodiment, the high gain amplifier 407 is replaced by a low gain amplifier 507 since high gain is no longer necessary for proper operation of the regulator 500. The compensation circuit 405 includes resistors R1 and R2 and capacitors C1 and C2. The capacitors C1 and C2 of the compensation circuit 405 are eliminated and tuning is no longer necessary for proper operation of the regulator 500.

Figure 7:
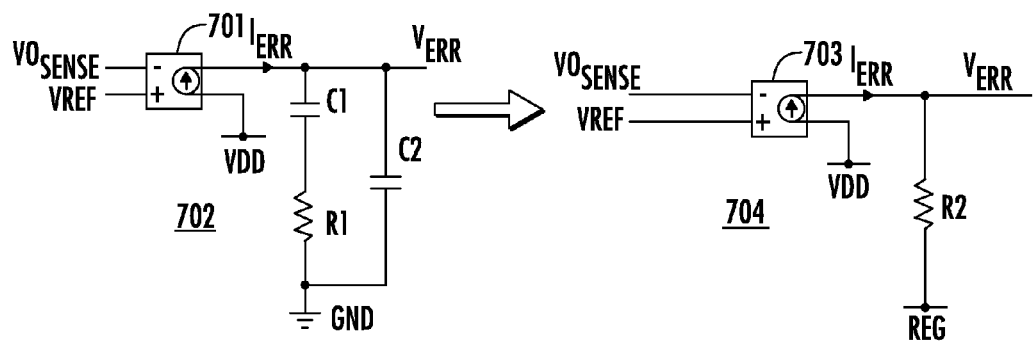
FIG. 7 is a schematic diagram of an exemplary amplifier circuit instead of the error amplifier and compensation circuit of FIG. 4 and an exemplary replacement amplifier circuit using a transconductance amplifier in accordance with an embodiment of the present invention.

FIG. 7 is a schematic diagram of an exemplary amplifier circuit 702 instead of the error amplifier 407 and compensation circuit 405 and an exemplary replacement amplifier circuit 704 using a transconductance amplifier 703 in accordance with an embodiment of the present invention. The transconductance amplifier 701 is a high gain amplifier which generates an error current $I_{ERR}$ based on a difference between VO$_{SENSE}$ and VREF, where I$_{ERR}$ is provided into a compensation circuit comprising a resistor R1 and capacitors C1 and C2 to develop an error voltage V$_{ERR}$ shown referenced to ground. The transconductance amplifier 703 also generates an error current I$_{ERR}$ based on a difference between VO$_{SENSE}$ and VREF, except that the compensation circuit is eliminated and replaced by a resistor R2 for developing the error voltage V$_{ERR}$ referenced to a DC voltage REG. In one embodiment, the transconductance amplifier 703 is a high gain amplifier where the transconductance amplifier 701 may be used. In an alternative embodiment, the transconductance amplifier 703 is a low gain amplifier since a high gain amplifier is not necessary for proper operation of the regulator 500.

Figure 8:
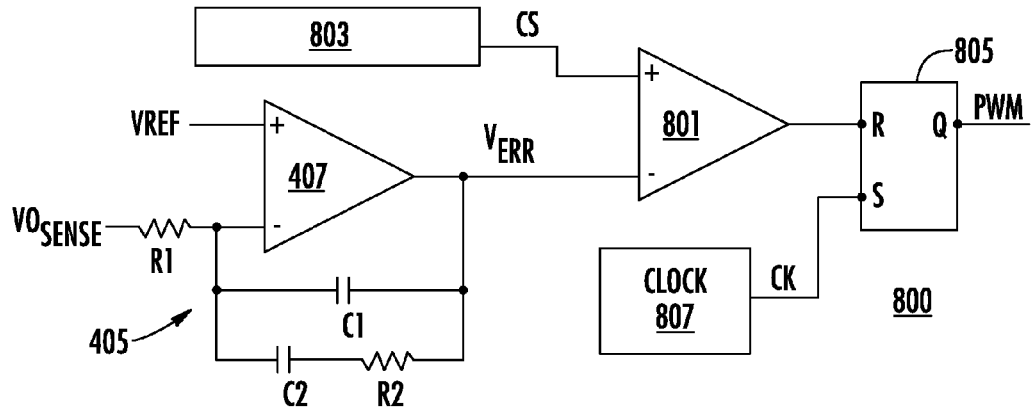
FIG. 8 is a simplified schematic and block diagram of a conventional peak current mode regulator.

FIG. 8 is a simplified schematic and block diagram of a conventional peak current mode regulator 800. VO$_{SENSE}$ and VREF are provided to the error amplifier 407 with the compensation circuit 405 to develop the error voltage V$_{ERR}$ in a similar manner previously described, where V$_{ERR}$ is provided to the inverting input of a comparator 801. A current sense circuit 803 provides the current sense signal CS to the non-inverting input of the comparator 801, having an output providing a reset signal to the reset input of an SR latch 805. A clock circuit 807 develops a clock signal CK provided to the set input of the SR latch 805, having an output providing the PWM signal. The clock signal CK sets the SR latch 805 each cycle pulling the PWM signal high to initiate the power portion of the cycle. When CS rises above V$_{ERR}$, the comparator 801 resets the SR latch 805 to pull PWM back low for the remainder of the cycle. The error amplifier 407 is a high gain amplifier and the compensation circuit 405 is needed for proper operation of the regulator 800. Also, the compensation circuit 405 is externally provided (e.g., not integrated on the control IC or chip) since it must generally be tuned to ensure proper operation.

Figure 9:
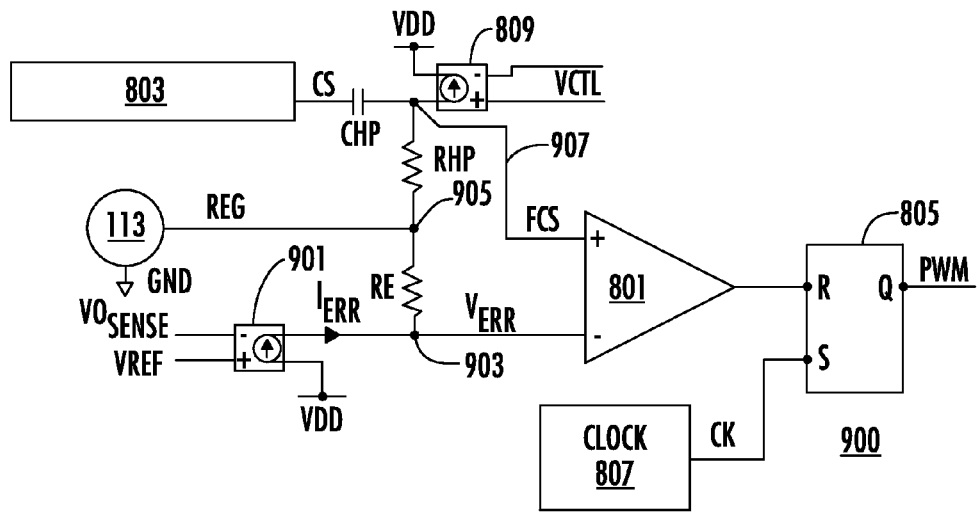
FIG. 9 is a simplified schematic and block diagram of a peak current mode regulator implemented according to one embodiment of the present invention.

FIG. 9 is a simplified schematic and block diagram of a peak current mode regulator 900 implemented according to one embodiment of the present invention. The current sense circuit 803 provides the current sense voltage CS in a similar manner. The comparator 801, the clock circuit 807, and the SR latch 805 are included and coupled in similar manner. The error amplifier 407 and the compensation circuit 405 are replaced with a transconductance amplifier 901 providing an error current I$_{ERR}$ to a node 903, where I$_{ERR}$ is proportional to the difference between VO$_{SENSE}$ and VREF. The voltage source 113 provides the regulated constant voltage level REG to a node 905, and a resistor RE is provided between nodes 903 and 905. The node 903 develops V$_{ERR}$ which is provided to the inverting input of the comparator 801. The CS voltage is provided to one end of a capacitor CHP, having its other end coupled to a node 907, which is further coupled to one end of a resistor RHP. The other end of the resistor RHP is coupled to the node 905 with the DC voltage REG. The resistor RHP and the capacitor CHP collectively form a high pass RC filter for filtering the CS voltage to provide a filtered voltage FCS on node 907, where node 907 is coupled to the non-inverting input of the comparator 801. Another transconductance amplifier 809 is provided having a voltage input receiving a control voltage VCTL and an output pulling a current proportional to VCTL from node 907. The VCTL voltage is configured to subtract an offset of half the peak-peak level of the CS voltage. The high pass filtering of CS to provide FCS and referencing FCS to a common DC level as V$_{ERR}$ (via RE) enables a significant simplification of the error amplifier circuit. In this embodiment, the high gain error amplifier 407 is replaced with the error amplifier 901, which may be implemented as a low gain amplifier with little or no compensation.

Thus, the compensation circuit 405 is eliminated and the entire circuit may be implemented on chip.

Figure 10:
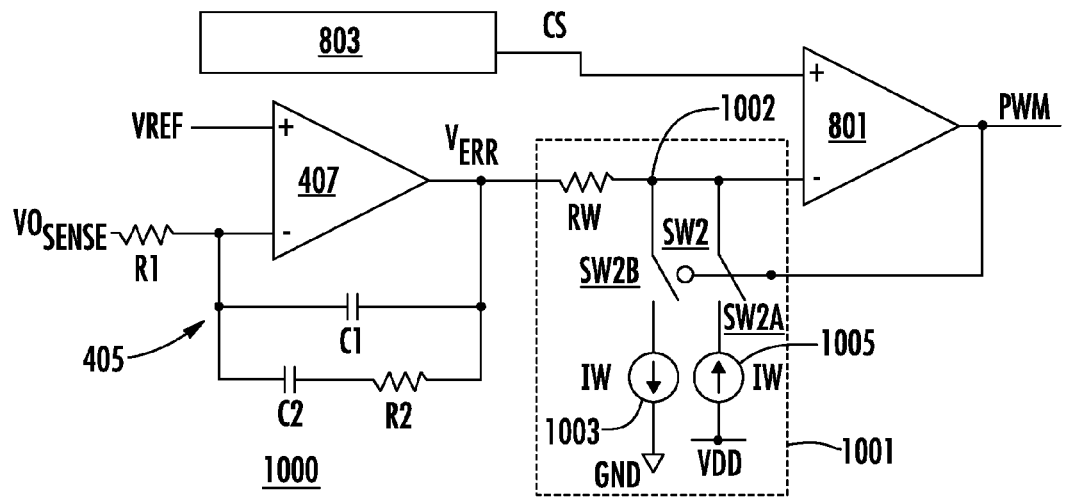
FIG. 10 is a simplified schematic and block diagram of a conventional peak-valley current mode regulator.

FIG. 10 is a simplified schematic and block diagram of a conventional peak-valley current mode regulator 1000. VO$_{SENSE}$ and VREF are provided to the error amplifier 407 with the compensation circuit 405 to develop the error voltage V$_{ERR}$ in a similar manner as the regulator 800. Also, the current sense circuit 803 provides the current sense signal CS to the non-inverting input of the comparator 801 in a similar manner as the regulator 800. In this case, however, a hysteretic window circuit 1001 is provided including a window resistor RW, a switch circuit SW2, and two current devices 1003 and 1005. The current devices 1003 and 1005 both develop a window current IW. In this case, one end of RW is coupled to the output of the error amplifier 407 developing V$_{ERR}$ and the other end of RW is coupled to a node 1002 which is further coupled to the inverting input of the comparator 801. The switch circuit SW2 is configured with two switches SW2A and SW2B in a similar manner as previously described. The switch SW2A has switched terminals coupled between node 1002 and a negative terminal of current device 1005, which has a positive terminal coupled to VDD. The switch SW2B has switched terminals coupled between node 1002 and a positive terminal of current device 1003, which has a negative terminal coupled to ground. The output of the comparator 801 provides the PWM signal, which controls the switch circuit SW2.

In operation of the regulator 1000, when PWM is low, SW2A is opened and SW2B is closed so that current device 1003 draws current IW from node 1002 to ground. The window current IW flows into node 1002 through RW which causes a negative window voltage (VW=−RW*IW) to develop across RW decreasing the voltage of node 1002 by VW relative to V$_{ERR}$. When CS falls to the lowered voltage level of node 1002, the comparator 801 switches state and pulls PWM high. When PWM is high, SW2A is closed and SW2B is opened so that current device 1005 sources current IW from VDD to node 1002. In this case, the window current IW flows through RW from node 1002 in the opposite direction which causes a positive window voltage (VW=RW*IW) to develop across RW thereby increasing the voltage of node 1002 by VW relative to V$_{ERR}$. When CS rises to the increased voltage level of node 1002, the comparator 801 switches state again and pulls PWM back low. Once again, the error amplifier 407 is a high gain amplifier and the compensation circuit 405 is needed for proper operation of the regulator 1000. Also, the compensation circuit 405 is externally provided (e.g., not integrated on the control IC or chip) since it must generally be tuned to ensure proper operation.

Figure 11:
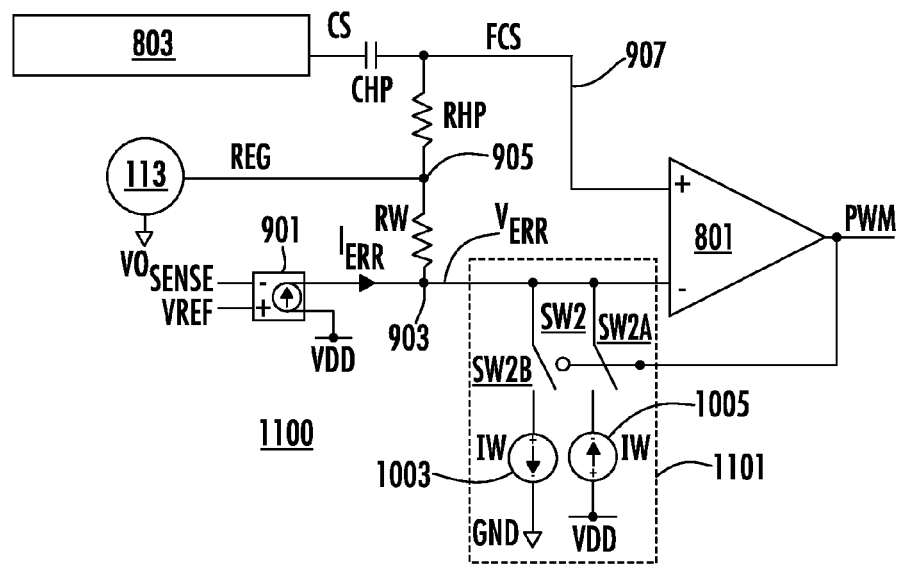
FIG. 11 is a simplified schematic and block diagram of a peak-valley current mode regulator implemented according to one embodiment of the present invention.

FIG. 11 is a simplified schematic and block diagram of a peak-valley current mode regulator 1100 implemented according to one embodiment of the present invention. The current sense circuit 803 provides the current sense voltage CS in a similar manner and the comparator 801 is included having an output providing the PWM signal in similar manner. The error amplifier 407 and the compensation circuit 405 are replaced with a transconductance amplifier 901 providing an error current I$_{ERR}$ to a node 903, where I$_{ERR}$ is proportional to the difference between VO$_{SENSE}$ and VREF. The voltage source 113 provides the regulated constant voltage level REG to a node 905. The hysteretic window circuit 1001 is replaced with a similar hysteretic window circuit 1101 which includes the switch circuit SW2 and the current devices 1003 and 1005, but which does not include the window resistor RW. Instead, the window resistor RW is coupled between nodes 903 and 905. The switches SW2A and SW2B are coupled directly to node 903. The node 903 develops V$_{ERR}$ which is provided to the inverting input of the comparator 801. The CS voltage is provided to one end of a capacitor CHP, having its other end coupled to a node 907 which is coupled to the non-inverting input of the comparator 801. Node 907 is further coupled to one end of a resistor RHP, having its other end coupled to the node 905 with the DC voltage REG.

Operation of the regulator 1100 is similar to that of the regulator 1000. For the regulator 1100, node 903 is the current node developing $V_{ERR}$ across the resistor RW relative to the REG voltage. $V_{ERR}$ is increased by VW=IW*RW when SW2A is closed and decreased by VW when SW2A is closed forming a similar hysteretic window operation. The resistor RHP and the capacitor CHP collectively form a high pass RC filter for filtering the CS voltage to provide a filtered voltage FCS on node 907. The high pass filtering of CS to provide FCS and referencing FCS to a common DC level as $V_{ERR}$ (via RW) enables a significant simplification of the error amplifier circuit. In this embodiment, the high gain error amplifier 407 is replaced with the error amplifier 901, which may be implemented as a low gain amplifier with little or no compensation. Thus, the compensation circuit 405 is eliminated and the entire circuit may be implemented on chip.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A controller for a switching regulator, wherein said switching regulator comprises a pulse switch circuit coupled to an output inductor for developing an output voltage, said controller comprising:
    a sense circuit which provides a sense signal indicative of current through the output inductor;
    an error amplifier circuit comprising an uncompensated amplifier which develops an error signal indicative of error of the output voltage;
    a filter and reference circuit which high pass filters said sense signal to provide a filtered sense signal and which balances said filtered sense signal and said error signal at a common DC level; and
    a comparator circuit which develops a pulse control signal using said error signal and said filtered sense signal, wherein said pulse control signal is for controlling switching of the pulse switch circuit.

2. The controller of claim 1, wherein said error amplifier circuit comprises a low gain amplifier.

3. The controller of claim 1, wherein said comparator circuit comprises:
    at least one offset circuit which adds an offset to said error signal to provide an offset signal; and
    a comparator which compares said offset signal with said filtered sense signal.

4. The controller of claim 1, wherein said sense circuit comprises:
    a transconductance amplifier circuit having an input which senses voltage applied across the output inductor and an output which provides a sense current; and
    a first capacitor having a first end coupled to said output of said transconductance amplifier circuit and a second end coupled to a reference voltage, wherein said first end of said first capacitor develops said sense signal as a sense voltage.

5. The controller of claim 4, wherein:
    said error amplifier circuit has an output providing an error current indicative of error of the output voltage; and
    and wherein said filter and reference circuit comprises:
        a voltage source providing a DC voltage;
        a first resistive device coupled between said sense voltage and said DC voltage; and
        a second resistive device coupled between said DC voltage and said output of said error amplifier circuit which develops said error signal as an error voltage.

6. The controller of claim 5, further comprising an anti-saturation circuit which decouples said first resistive device during a portion of a cycle based on said pulse control signal.

7. The controller of claim 5, further comprising:
    a balanced hysteretic window circuit having a center node receiving said error voltage, having a first node developing a window voltage and having a second node developing a compensation voltage, wherein said first and second nodes are balanced on either side of said center node receiving said error voltage;
    a frequency control circuit providing a differential window current to said first and second nodes; and
    a controllable switch, controlled by the pulse control signal, which selectively couples an input of said comparator circuit between said first and second nodes of said balanced hysteretic window circuit.

8. The controller of claim 1, wherein:
    said sense circuit provides a sense voltage indicative of current through the output inductor and wherein said error amplifier circuit develops an error voltage indicative of error of the output voltage;
    wherein said filter and reference circuit comprises:
        a high pass filter having an input receiving said sense voltage and an output providing a filtered sense voltage; and
        a balanced voltage circuit having a center node receiving said error voltage and first and second voltage nodes; and
    wherein said comparator circuit comprises:
        a first comparator having a first input receiving said filtered sense voltage, a second input coupled to said first voltage node of said balanced voltage circuit, and an output providing a first control signal;
        a second comparator having a first input receiving said filtered sense voltage, a second input coupled to said second voltage node of said balanced voltage circuit, and an output providing a second control signal; and
        a logic circuit having a first input receiving said first control signal, a second input receiving said second control signal, and an output for providing said pulse control signal.

9. The controller of claim 1, wherein:
    said sense circuit provides a sense voltage indicative of current through the output inductor and wherein said error amplifier circuit develops an error voltage indicative of error of the output voltage;
    wherein said comparator circuit comprises a comparator having a first input, a second input receiving said error voltage, and an output providing said pulse control signal;
    wherein said filter and reference circuit comprises:
        a voltage source providing a DC voltage;
        a high pass filter, referenced to said DC voltage, having an input receiving said sense voltage and an output providing said filtered sense voltage to said first input of said comparator; and a resistive device coupled between said DC voltage and said error voltage; and further comprising a hysteretic window circuit coupled to said second input of said comparator and controlled by said pulse control signal.

10. The controller of claim 1, further comprising:

said sense circuit providing a sense voltage indicative of current through the output inductor and said error amplifier circuit developing an error voltage indicative of error of the output voltage;

said comparator circuit comprising a comparator having a first input, a second input receiving said error voltage, and an output;

a clock circuit providing a clock signal;

a logic circuit having a first input coupled to said output of said comparator, a second input receiving said clock signal, and an output providing said pulse control signal;

wherein said filter and reference circuit comprises:

a voltage source providing a DC voltage;

a high pass filter, referenced to said DC voltage, having an input receiving said sense voltage and an output providing said filtered sense voltage to said first input of said comparator; and a resistive device coupled between said DC voltage and said error voltage; and a current offset circuit coupled to said second input of said comparator.

11. A switching regulator providing a regulated output voltage, comprising:

an output inductor developing the output voltage;

a pulse switch circuit receiving a pulse control signal for switching current through said output inductor; and a controller, comprising:

a sense circuit which provides a sense signal indicative of said current through said output inductor;

an error amplifier circuit comprising an uncompensated amplifier which develops an error signal indicative of error of the output voltage;

a filter and reference circuit which high pass filters said sense signal to provide a filtered sense signal and which balances said filtered sense signal and said error signal at a common DC level; and a comparator circuit which develops said pulse control signal using said error signal and said filtered sense signal.

12. The switching regulator of claim 11, wherein said error amplifier circuit comprises a low gain amplifier.

13. The switching regulator of claim 11, wherein said comparator circuit comprises:

at least one offset circuit which adds an offset to said error signal to provide an offset signal; and a comparator which compares said offset signal with said filtered sense signal.

14. The switching regulator of claim 11, wherein:

said sense circuit develops said sense signal as a sense voltage;

wherein said error amplifier circuit develops said error signal as an error voltage; and and wherein said filter and reference circuit comprises:

a voltage source providing a DC voltage;

a first resistive device coupled between said sense voltage and said DC voltage; and a second resistive device coupled between said DC voltage and said error voltage.

15. The switching regulator of claim 14, further comprising an anti-saturation circuit which decouples said first resistive device during a portion of a cycle based on said pulse control signal.

16. The switching regulator of claim 14, further comprising:

a balanced hysteretic window circuit having a center node receiving said error voltage, having a first node developing a window voltage and having a second node developing a compensation voltage, wherein said first and second nodes are balanced on either side of said center node receiving said error voltage;

a frequency control circuit providing a differential window current to said first and second nodes; and a controllable switch, controlled by the pulse control signal, which selectively couples an input of said comparator circuit between said first and second nodes of said balanced hysteretic window circuit.

17. The switching regulator of claim 11, wherein:

said sense circuit provides a sense voltage indicative of current through the output inductor and wherein said error amplifier circuit develops an error voltage indicative of error of the output voltage;

wherein said filter and reference circuit comprises:

a high pass filter having an input receiving said sense voltage and an output providing a filtered sense voltage; and a balanced voltage circuit having a center node receiving said error voltage and first and second voltage nodes; and wherein said comparator circuit comprises:

a first comparator having a first input receiving said filtered sense voltage, a second input coupled to said first voltage node of said balanced voltage circuit, and an output providing a first control signal;

a second comparator having a first input receiving said filtered sense voltage, a second input coupled to said second voltage node of said balanced voltage circuit, and an output providing a second control signal; and a logic circuit having a first input receiving said first control signal, a second input receiving said second control signal, and an output for providing said pulse control signal.

18. The switching regulator of claim 11, wherein:

said sense circuit provides a sense voltage indicative of current through the output inductor and wherein said error amplifier circuit develops an error voltage indicative of error of the output voltage;

wherein said comparator circuit comprises a comparator having a first input, a second input receiving said error voltage, and an output providing said pulse control signal;

wherein said filter and reference circuit comprises:

a voltage source providing a DC voltage;

a high pass filter, referenced to said DC voltage, having an input receiving said sense voltage and an output providing said filtered sense voltage to said first input of said comparator; and a resistive device coupled between said DC voltage and said error voltage; and further comprising a hysteretic window circuit coupled to said second input of said comparator and controlled by said pulse control signal.

19. The switching regulator of claim 11, further comprising:

said sense circuit providing a sense voltage indicative of current through the output inductor and said error amplifier circuit developing an error voltage indicative of error of the output voltage;

said comparator circuit comprising a comparator having a first input, a second input receiving said error voltage, and an output;

a clock circuit providing a clock signal;

a logic circuit having a first input coupled to said output of said comparator, a second input receiving said clock signal, and an output providing said pulse control signal;

wherein said filter and reference circuit comprises:

a voltage source providing a DC voltage;

a high pass filter, referenced to said DC voltage, having an input receiving said sense voltage and an output providing said filtered sense voltage to said first input of said comparator; and a resistive device coupled between said DC voltage and said error voltage; and a current offset circuit coupled to said second input of said comparator.

20. An electronic device, comprising:

a switching regulator providing a regulated output voltage, comprising:

an output inductor developing said output voltage;

a pulse switch circuit receiving a pulse control signal for switching current through said output inductor; and a controller, comprising:

a sense circuit which provides a sense signal indicative of said current through said output inductor;

an error amplifier circuit comprising an uncompensated amplifier which develops an error signal indicative of error of the output voltage;

a filter and reference circuit which high pass filters said sense signal to provide a filtered sense signal and which balances said filtered sense signal and said error signal at a common DC level; and a comparator circuit which develops said pulse control signal using said error signal and said filtered sense signal; and a load receiving said regulated output voltage.

\* \* \* \* \*